United States Patent

Sheikh et al.

[11] Patent Number: 6,088,653
[45] Date of Patent: *Jul. 11, 2000

[54] ATTITUDE DETERMINATION METHOD AND SYSTEM

[76] Inventors: Suneel I. Sheikh, 1012 Thomas Ave. South, Minneapolis, Minn. 55405; Lawrence C. Vallot, 5925 Turtle Lake Rd., Shoreview, Minn. 55126; Brian W. Schipper, 9148 Woodhall Crossing, Brooklyn Park, Minn. 55443

[*] Notice: This patent issued on a continued prosecution application filed under 37 CFR 1.53(d), and is subject to the twenty year patent term provisions of 35 U.S.C. 154(a)(2).

[21] Appl. No.: 08/775,504

[22] Filed: Dec. 31, 1996

[51] Int. Cl.$^7$ .................................................. H40B 7/185
[52] U.S. Cl. ............................. 701/214; 701/4; 701/215; 342/357
[58] Field of Search ................................... 701/3, 4, 213, 701/215, 220, 221; 342/357; 73/178 R

[56] References Cited

U.S. PATENT DOCUMENTS

| | | | |
|---|---|---|---|
| 4,384,293 | 5/1983 | Deem et al. | 343/113 R |
| 4,719,469 | 1/1988 | Beier et al. | 342/434 |
| 4,754,280 | 6/1988 | Brown et al. . | |
| 4,963,889 | 10/1990 | Hatch | 342/357 |
| 5,021,792 | 6/1991 | Hwang | 342/357 |
| 5,072,227 | 12/1991 | Hatch | 342/357 |
| 5,101,356 | 3/1992 | Timothy et al. | 364/449 |
| 5,119,101 | 6/1992 | Barnard | 342/357 |
| 5,185,610 | 2/1993 | Ward et al. | 342/357 |
| 5,359,521 | 10/1994 | Kyrtsos et al. | 364/449 |
| 5,402,347 | 3/1995 | McBurney et al. | 364/443 |
| 5,430,954 | 7/1995 | Kyrtsos et al. | 364/449 |
| 5,452,211 | 9/1995 | Kyrtsos et al. | 364/449 |
| 5,470,233 | 11/1995 | Fruchterman et al. | 434/112 |
| 5,543,804 | 8/1996 | Buchler et al. | 342/357 |
| 5,553,812 | 9/1996 | Gold et al. | 244/76 R |
| 5,563,607 | 10/1996 | Loomis et al. | 342/357 |
| 5,570,304 | 10/1996 | Mart et al. | 364/571.03 |
| 5,623,414 | 4/1997 | Misra | 364/449.1 |
| 5,757,646 | 5/1998 | Talbot et al. | 364/449.9 |

FOREIGN PATENT DOCUMENTS

9608730A  3/1996  WIPO .

Primary Examiner—William A. Cuchlinski, Jr.
Assistant Examiner—Arthur D. Donnelly
Attorney, Agent, or Firm—John G. Shudy, Jr.

[57] ABSTRACT

A method for use in vehicle attitude determination includes generating GPS attitude solutions for a vehicle using three or more antennas receiving GPS signals from two or more space vehicles. An inertial navigation system is initialized by setting the attitude of the inertial navigation system to a GPS attitude solution generated for the vehicle and/or the attitude of the inertial navigation system is updated using the GPS attitude solutions generated for the vehicle or GPS estimated attitude error generated for the vehicle. A system for use in vehicle navigation is also provided. The system generally includes three or more GPS antenna/receiver sets associated with a vehicle, an inertial measurement unit that provides inertial measurements for the vehicle, a processing unit of the system having the capability for generating GPS attitude computations for the vehicle using the three or more GPS antenna/receiver sets and signals from two or more space vehicles; the GPS attitude computations include at least one of absolute attitudes and estimated attitude errors. The processing unit of the system also includes a filter for generating estimates of attitude for the vehicle using the inertial measurements from the inertial measurement unit and the attitude computations.

33 Claims, 7 Drawing Sheets

ATTITUDE DETERMINATION METHOD AND SYSTEM

FIELD OF THE INVENTION

The present invention relates to GPS attitude determination. More particularly, the present invention relates to GPS attitude determination and integration of GPS attitude determination with inertial navigation systems.

BACKGROUND OF THE INVENTION

Generally, the Global Positioning System (GPS) provides basically two fundamental quantities from each available GPS satellite, e.g., space vehicle (SV). These two fundamental quantities include a pseudorange measurement and SV position. While GPS, itself, is commonly thought of as a position determination system, measurements using GPS signals are actually processed to compute delta positions, i.e., a change or difference in one position with respect to a second position. Such computations are made after receipt of GPS signals from one or more GPS SVs by one or more GPS antenna/receiver sets. The two positions may be, for example, a current position with respect to a previous position, a position of one antenna with respect to another antenna at one particular time (or relative position therebetween), or a current relative position with respect to a previous relative position.

As part of the GPS, each SV continuously transmits a navigation signal, i.e., SV position signal, containing navigation message data such as, for example, time of transmission, satellite clock data, and ephemeris data. The navigation signal is broadcast over two separate carrier signals, denoted as $L_1$ and $L_2$, each of which is modulated by a separate pseudorandom digital code that is unique to the SV from which it is transmitted. For conventional GPS navigation, a GPS receiver typically tracks four SVs, establishing synchronism with the SVs' transmitted navigation signal by way of a local clock at the receiver, and recovers the navigation message data.

GPS receivers typically derive two types of measurements from the received GPS signals, referred to as "code measurements" and "carrier measurements." For example, the pseudorandom digital code signals recovered by the GPS receiver can be used to provide code measurements including a measure of the distance to each SV, i.e., pseudorange measurement. This is not necessarily the same as actual range to the SV because of the lack of time clock synchronism between the satellite and the GPS receiver, which can be virtually eliminated by using multiple SV pseudorange measurements to correct for lack of clock synchronism. Further, in contrast to using pseudorandom digital code signals to provide pseudorange measurements, carrier phase measurements made by the GPS receiver typically provide for more accurate range measurements. Further, range measurements can be made using other methods such as carrier-smoothed code-based pseudorange. In the case of carrier phase based measurements, accurate knowledge of the phase within a single wavelength is available, however, an unknown integral number of carrier signal wavelengths, the phase ambiguity, between a GPS SV and GPS receiver antenna exists, and must be resolved. The resolution of the ambiguity, including the resolution of any clock error between GPS SVs and GPS receivers, is not addressed herein and is assumed to be corrected by one of any number of methods for correcting such ambiguity available in the art.

Typical GPS receivers for tracking a GPS satellite generally require synchronization with and demodulation of the carrier signal and code from the GPS signals received. In most designs, a correlation process establishes carrier and code tracking loops that align selected GPS carrier and code signals with corresponding replica carrier and code signals generated within the receiver to recover code measurements and carrier measurements.

For illustration, a receiver measures pseudorange, i.e., range from an antenna to an SV, by measuring phase shift between the GPS code signals and the receiver replica code signals. Such phase shift is representative of transit time and therefore a pseudorange measurement.

For attitude determination, multiple antenna/receiver sets with the antennas at fixed vehicle body locations are used. Then, differential carrier phase measurements can be made for multiple antennas with respect to a single SV. This differential measurement process eliminates the time effect (attributable to the SV), so that only the relative position effect (attributable to the multiple antennas) remains. For example, by using carrier phase measurements of the GPS signal received from an SV at two antenna/receiver sets, a differential carrier phase measurement representative of the relative position of one of the antennas with respect to the other antenna can be made.

With the use of differential measurements, measuring and processing of the relative position measurements for GPS signals received at three or more non-colinear antennas for at least two GPS SVs are used for the generation of attitude vectors required for providing full three dimensional attitude determination. For a vehicle having three antennas at fixed locations, the attitude determination using such differential carrier phase measurements represents the attitude of a plane defined by the antennas.

Typically, in aircraft and spacecraft, inertial navigation systems (INS) determine attitude of the vehicle. An INS typically contains an inertial measurement unit (IMU) including gyroscopes, accelerometers, a processor unit to compute the navigation solutions necessary for navigation and attitude reference, and various other data communication sources. The INS is sufficient to produce a vehicle navigation solution. However, over time, IMU sensor errors associated with computation of this solution increase. Sometimes these errors increase to the point that a navigation solution is unattainable within the INS. To alleviate this problem with the IMU errors and to compute a correct navigation solution over the vehicle's entire flight, external navigation sources, such as magnetometers, Doppler radars, radar altimeters, star sensors, horizon sensors, etc., are typically utilized to continually update, or correct, the INS's estimate of the navigation solution.

Several methods have conventionally been used to optimally produce an integrated navigation solution. Two such typical methods include the complementary filter method and an extended Kalman filter method. As known to those skilled in the art, the complementary filter method generally uses fixed gains in the computation of attitude errors, whereas the Kalman filter method computes time varying gains based on available data to compute the attitude errors. Both of these methods are typically utilized in the INS processor to blend the data from the IMU and the external navigation sources.

The use of the above noted internal IMU navigation sources within an INS for use in computing a navigation solution, including attitude, do not provide for continuous, error free solutions. Therefore, there is a need for an external source, to alleviate such problems. The present invention uses GPS to compute attitude and integrates such computations into an INS to alleviate the problem of errors in navigation solutions produced using an IMU and further, addresses other problems as will be readily apparent to one skilled in the art from the description of the present invention as set forth in detail below.

SUMMARY OF THE INVENTION

A method in accordance with the present invention for use in vehicle attitude determination includes generating GPS attitude solutions for a vehicle using three or more antennas receiving GPS signals from two or more space vehicles. An inertial navigation system is initialized by setting the attitude of the inertial navigation system to a GPS attitude solution generated for the vehicle.

In one embodiment of the method, the method further includes aligning the inertial navigation system by updating the attitude of the initialized inertial navigation system using the GPS attitude solutions generated for the vehicle.

In another embodiment of the method, the method further includes computing GPS estimated attitude errors using the three or more antennas receiving GPS signals from two or more space vehicles. The inertial navigation system is aligned by updating the attitude of the inertial navigation system using the GPS estimated attitude errors. The estimated attitude error may be computed by providing an estimated vehicle attitude and determining an error in the estimated vehicle attitude using the at least three antennas and signals from the at least two space vehicles, i.e., such as with differential carrier phase measurements.

In another embodiment of the method, the initialization and alignment steps are performed when the vehicle is in motion.

In another embodiment of the invention, the method further includes updating the attitude of the inertial navigation system using the GPS attitude solutions generated for the vehicle or using the GPS estimated attitude errors.

In another method in accordance with the present invention for use in vehicle attitude determination, the method includes generating GPS estimated attitude errors for a vehicle using at least three antennas receiving signals from at least two space vehicles. Attitude estimates of an inertial navigation system, i.e., generated from measurements of the inertial measurement unit of the navigation system, are updated using the estimated attitude errors.

A system in accordance with the present invention for use in vehicle navigation is also provided. The system includes three or more GPS antenna/receiver sets associated with a vehicle. An inertial measurement unit provides inertial measurements for the vehicle. A processing unit of the system includes the capability for generating GPS attitude computations for the vehicle using the three or more GPS antenna/receiver sets and signals from two or more space vehicles. The GPS attitude computations include at least one of absolute attitudes and estimated attitude errors. The processing unit further includes a filter for generating estimates of attitude for the vehicle using the inertial measurements from the inertial measurement unit and the attitude computations generated using the three or more GPS antenna/receiver sets and signals from the two or more space vehicles.

DETAILED DESCRIPTION OF THE EMBODIMENTS

Figure 1:
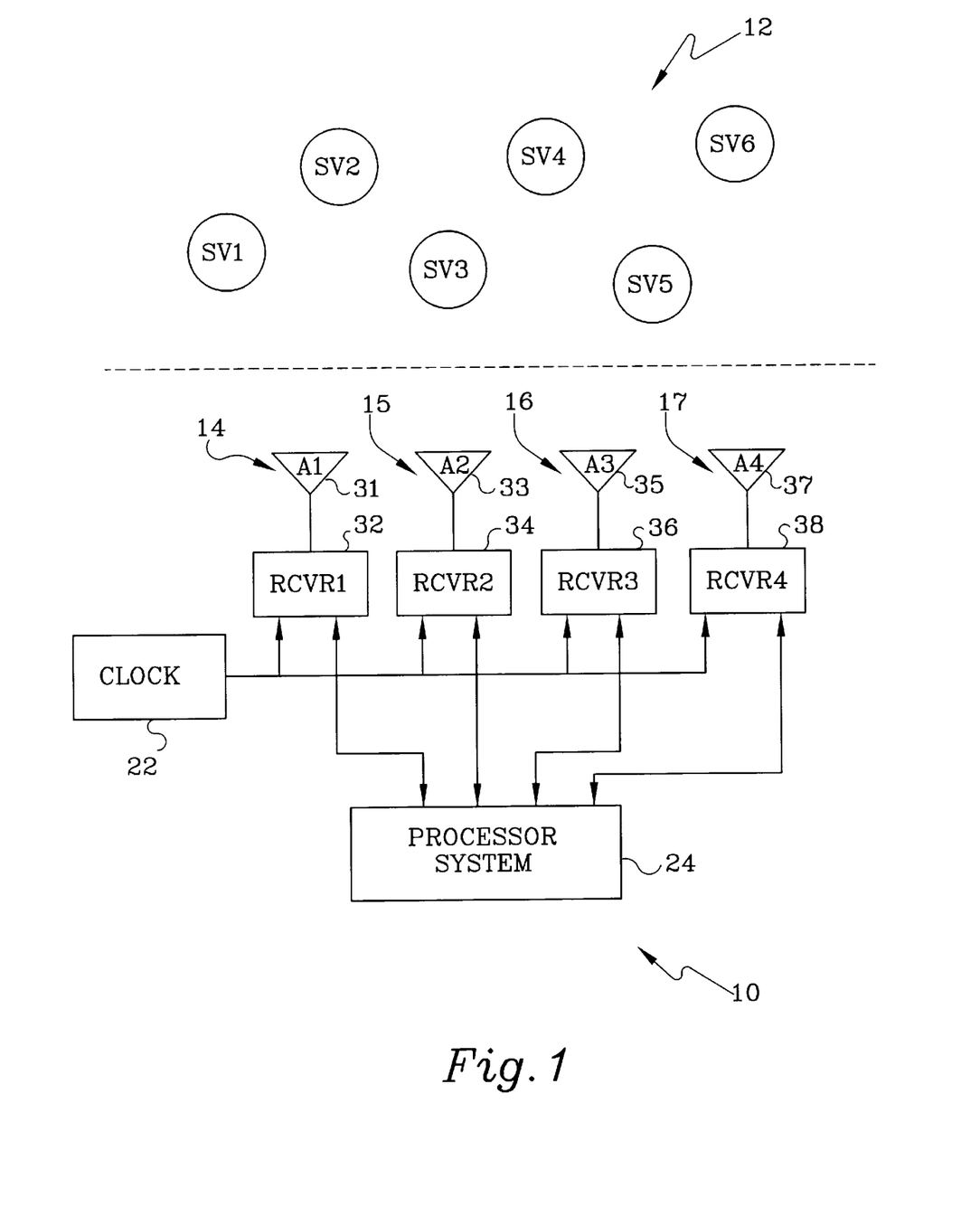
FIG. 1 is a block diagram of a GPS attitude determination system in accordance with the present invention; the GPS attitude determination system is shown relative to satellites, i.e., SVs, of the GPS.

The present invention shall be described with reference to FIGS. 1–7. A GPS attitude determination system 10 for computing absolute attitude, i.e., whole value attitude, and perturbation attitude, i.e., estimated attitude error, in accordance with the present invention is shown in FIG. 1. The GPS attitude determination system 10 is shown illustratively in conjunction with six satellites, i.e., SVs 12, which as known to one skilled in the art, orbit the earth while providing GPS signals for use by GPS position determination systems, such as GPS attitude determination system 10, to generate attitude information for a vehicle, such as, for example, attitude for an aircraft.

The vehicle may be any vehicle for which determination of attitude is desired. For example, the vehicle may be a space vehicle, i.e., a satellite, may be a land based vehicle, may be an aircraft, etc. It will be readily apparent to one skilled in the art from the description below that the present invention is particularly advantageous for attitude determination of space vehicle applications. For example, the present invention integrates direct determination of GPS attitude measurements into an INS, as opposed to indirect use of GPS positioning measurements such as position or velocity. As such, present invention provides direct visibility into the attitude errors of the INS occurring from attitude computations based on IMU measurements, as opposed to a somewhat indirect visibility of those errors provided through the use of position or velocity observations. In the case of space vehicle applications, this direct attitude observability is crucial to the continuous updating of IMU based attitude errors; those errors being a result of solution computation using IMU measurements over time as described in the Background of the Invention section herein.

The system 10 includes four separate antenna/receiver sets 14–17 although it is possible that the GPS receivers could be a channelized single receiver. Further, any number of antenna/receiver sets greater than two can be used. Each of the antenna/receiver sets 14–17 include an antenna 31, 33, 35, 37, such as an omnidirectional antenna, #501 antenna available from NovAtel (Canada), a low profile antenna and preamplifier #16248-50 available from Trimble Navigation Ltd., an active antenna #AN150 available from Canadian Marconi Company (Canada), or any other antenna suitable for receiving GPS signals from the SVs. Further, each of the antenna/receiver sets 14–17 include a GPS receiver 32, 34, 36, 38 connected to the respective antenna 31, 33, 35, 37 of the set and suitable for receiving the GPS signals from the respective antenna and for generating code pseudorange measurements and carrier phase measurements from the GPS signals as received. Such GPS receivers may include a #MET 5000 available from NovAtel (Canada), a TANS Vector receiver available from Trimble Navigation Ltd., an ALLSTAR CMT-1200 available form Canadian Marconi Company (Canada), or any other suitable GPS receiver. Antenna/receiver set 14 includes antenna 31 (A1) and receiver 32 (R2); antenna/receiver set 15 includes antenna 33 (A2) and receiver 34 (R2); antenna/receiver set 16 includes antenna 35 (A3) and receiver 36 (R3); and antenna/receiver set 17 includes antenna 37 (A4) and receiver 38 (R4).

Each of the receivers 32, 34, 36 and 38 are provided with a clock 22 for synchronization with the clocks of the SVs to recover information from the GPS signals. The clock 22 may be a single clock provided to each GPS receiver, separate clocks provided to each GPS receiver, or one or more clocks provided to one or more receivers. Information generated by the receivers 32, 34, 36 and 38 is provided to processor system 24. Such information, for example, carrier phase measurements, are used by the processor system 24 to generate the desired output, such as attitude. The processor system 24 also controls the operation of the receivers 32, 34, 36 and 38.

The processor system 24 is suitable for carrying out absolute and perturbation attitude computations in accordance with the present invention, as described further below. Such attitude computations may then be integrated into an INS as also is described further below with reference to FIGS. 2–7. Generally, attitude solutions can be computed using at least three antenna/receiver sets available for such computation. As further described below, the attitude solutions using at least three antenna/receiver sets includes the use of measurements made from multiple SVs. For example, in most cases with respect to aircraft, measurements from two or three SVs are utilized for computation of attitude solutions. However, measurements from more than three SVs may be used.

The attitude solutions using at least three antenna/receiver sets can be calculated in the following manner by determining the relative positions of the antennas with respect to the others by using differential carrier phase measurements of the GPS signals using carrier phase measurements from the various SVs and antenna pairs. As previously stated, this specification assumes that any unknown phase ambiguities of such carrier phase measurements have been resolved in a manner known to those skilled in the art. Once the differential carrier phase measurement is calculated for each antenna of at least three antenna/receiver sets relative to the other antennas of the sets, the attitude of the plane defined by the three antennas can be determined using the algorithms described below.

For example, the computations may be performed for the antenna/receiver sets including antenna/receivers sets 14–16. The receivers 32, 34, and 36 of the antenna/receiver sets 14–16 are used to generate carrier phase measurements of the GPS carrier signals received by the antennas 31, 33, and 35, respectively, from multiple SVs, such as SV1–6. The carrier phase measurements are then used by the processor system 24 to generate the differential carrier phase measurements representative of the relative position of one of the antennas with respect to others, i.e., the antenna 31 of antenna/receiver set 14 relative to the antenna 33 of antenna/receiver set 15, for one of the SVs, i.e., SV1. All the other relative positions possible between the antennas 31, 33, and 35 of antenna/receiver sets 14–16 with respect to SV1 are also determined. The differential phase carrier measurements are then determined for the antenna/receiver sets 14–16 with respect to the other SVs, i.e., SV2–6. Following the determination of all the relative positions possible between the antennas 31, 33, and 35, of antenna/receiver sets 14–16, an attitude solution can be generated. In other words, multiple GPS satellites and more than two GPS antenna (antenna/receiver sets 14–16) are required for full three dimensional attitude computation.

Using the differential carrier phase measurements, absolute, i.e., whole value, attitude can be determined in the following manner. The following equation, Equation 1, represents the relationship between the GPS differential carrier phase measurements to the GPS SV line of sight vectors. This data is transformed into the proper reference frame by the attitude direction cosine matrix $A_I^B$, which transforms inertial frame vectors into body frame vectors, i.e., the body frame vectors being the vectors fixed in the vehicle body frame which rotate with the vehicle in the inertial frame. The attitude matrix is the unknown element of the equation, as all other data is known or measurable.

$$\Delta\Phi_{MN_i} = \frac{2\pi}{\lambda}\left\{\vec{L}_{MN_B} \cdot \left\{A_I^B\left(\frac{I_{\vec{r}_I}^{SV_i} - I_{\vec{r}_I}^{B}}{\|I_{\vec{r}_I}^{SV_i} - I_{\vec{r}_I}^{B}\|}\right)\right\}\right\} \quad \text{Equation 1)}$$

where:
$\Delta\Phi$ is the measured GPS differential carrier phase measurement between two antennas,
M, N are any two antennas,
i is the GPS satellite index,
$\vec{L}_B$ is the baseline vector between antennas in the body reference frame,
B is the body reference frame,
I is the inertial reference frame,
$\lambda$ is the GPS signal wavelength,
$A_I^B$ is the attitude matrix, transforming inertial to body frame,
$I_{\vec{r}_I} SV_i$ is the vector from the inertial origin to the GPS SV in inertial coordinates, and
$I_{\vec{r}_I} B$ is the vector from the inertial origin to the body in inertial coordinates.

The solution to this equation is determined by first assembling the measured data into appropriate arrays based upon the tracked GPS SVs, i.e., such as, for example, SV1–6, and the antennas of three antenna/receiver sets, i.e., such as, for example, antenna/receiver sets 14–16.

With the ratio of the difference of the SV vector to the antenna body frame origin vector over the difference's magnitude being written as shown in Equation 2, then Equation 1 can be written as shown below in Equation 3.

$$B\hat{r}_I^{SV_i} = \left[ \frac{{}^I\hat{r}_I^{SV_i} - {}^I\hat{r}_I^B}{\|{}^I\hat{r}_I^{SV_i} - {}^I\hat{r}_I^B\|} \right] \quad \text{Equation 2)}$$

where:

$B_{\hat{r}I}SV_i$ is the unit vector from the body frame origin to the GPS SV in inertial reference frame coordinates.

$$\Delta\Phi_{MN_i} = \frac{2\pi}{\lambda}\{\vec{L}_{MN_B} \cdot (A_I^{BB}\hat{r}_I^{SV_i})\} \quad \text{Equation 3)}$$

$$= \frac{2\pi}{\lambda}\begin{cases} L_{MN_{Bx}} \cdot (A_{I\,11}^B {}^B\hat{r}_{I_x}^{SV_i} + A_{I\,12}^B {}^B\hat{r}_{I_y}^{SV_i} + A_{I\,13}^B {}^B\hat{r}_{I_z}^{SV_i}) \\ L_{MN_{By}} \cdot (A_{I\,21}^B {}^B\hat{r}_{I_x}^{SV_i} + A_{I\,22}^B {}^B\hat{r}_{I_y}^{SV_i} + A_{I\,23}^B {}^B\hat{r}_{I_z}^{SV_i}) \\ L_{MN_{Bz}} \cdot (A_{I\,31}^B {}^B\hat{r}_{I_x}^{SV_i} + A_{I\,32}^B {}^B\hat{r}_{I_y}^{SV_i} + A_{I\,33}^B {}^B\hat{r}_{I_z}^{SV_i}) \end{cases}$$

It should be noted that the use of the differential carrier phase measurement in Equation 3 should not include any receiver clock error. Clock error is a result of unavoidable error in a GPS receiver's oscillator which will add directly to all measured pseudo ranges. If this clock error has not been removed in the cycle ambiguity resolution process then it should be removed before Equation 3 is used. The clock error may be resolved using any method for correcting for such errors as known to those skilled in the art. For example, the clock error may be removed by solving the standard GPS position Equation 4, then $\Delta\Phi = \Delta\Phi' - \text{clock}$.

$$\begin{bmatrix} dx \\ dy \\ dz \\ \text{clock} \end{bmatrix} = k\Delta\Phi' \quad \text{Equation 4)}$$

where:

$\Delta\Phi'$ does not have the clock error removed, $$k = (H^T H)^{-1} H^T$$

$$H = \begin{bmatrix} {}^B\hat{r}_{I_x}^{SV_i} & {}^B\hat{r}_{I_y}^{SV_i} & {}^B\hat{r}_{I_z}^{SV_i} & 1 \\ \vdots & \vdots & \vdots & \vdots \end{bmatrix}$$

Equation 3 can be written with respect to all tracked SVs and antennas, i.e., pairs of antennas of which the relationship is being determined, as Equation 5.

where;

$$[A]_{9\times 1} = \begin{bmatrix} A_{I\,11}^B \\ A_{I\,21}^B \\ A_{I\,31}^B \\ A_{I\,21}^B \\ A_{I\,22}^B \\ A_{I\,23}^B \\ A_{I\,31}^B \\ A_{I\,32}^B \\ A_{I\,33}^B \end{bmatrix}$$

and where:

$[A]_{9\times 1}$ is the attitude matrix $[A]$, which has three rows and three columns written in vector form.

Therefore, Equation 1 has now been represented as a linear equation with the attitude direction cosine matrix listed as a nine element vector in Equation 5 that can be solved using the least squares method. The nine element vector in Equation 5 can then be represented using symbols as shown in Equation 6.

$$[\Delta\Phi] = [LR][A]_{9\times 1} \quad \text{Equation 6)}$$

The solution to Equation 6 is found by forming a pseudo-inverse of the $[LR]$ matrix such that the following Equation 7 is derived.

$$[A]_{9\times 1} = ([LR]^T[LR])^{-1}[LR]^T[\Delta\Phi] \quad \text{Equation 7)}$$

where:

T is the matrix transpose, and
−1 is the matrix inverse.

To solve for this attitude solution, a 9×9 matrix inversion is required. Equation 7, therefore, represents the solution to determine vehicle attitude based upon GPS differential carrier phase measurements and line of sight vectors to the tracked GPS SVs. Because the attitude matrix $[A]_{3\times 3}$ is a special type of matrix, particularly an orthonormal matrix, Equation 7 itself does not guarantee that a proper direction cosine matrix is formed. The matrix determined by Equation 7 should be orthonormalized such that the end result represents a proper direction cosine matrix.

In the specific case of only two GPS SVs visible and tracked by three GPS antennas, only six unique measurements are available for attitude determination. This is insuf- $$\begin{bmatrix} \frac{\lambda}{2\pi}\Delta\Phi_{MNi} \\ \frac{\lambda}{2\pi}\Delta\Phi_{MNj} \\ \frac{\lambda}{2\pi}\Delta\Phi_{MNk} \\ \vdots \\ \frac{\lambda}{2\pi}\Delta\Phi_{MPi} \end{bmatrix} = \begin{bmatrix} L_{MN_{Bx}}{}^B\hat{r}_{I_x}^{SV_i} & L_{MN_{Bx}}{}^B\hat{r}_{I_y}^{SV_i} & L_{MN_{Bx}}{}^B\hat{r}_{I_z}^{SV_i} & L_{MN_{By}}{}^B\hat{r}_{I_x}^{SV_i} & L_{MN_{By}}{}^B\hat{r}_{I_y}^{SV_i} & L_{MN_{By}}{}^B\hat{r}_{I_z}^{SV_i} & L_{MN_{Bz}}{}^B\hat{r}_{I_x}^{SV_i} & L_{MN_{Bz}}{}^B\hat{r}_{I_y}^{SV_i} & L_{MN_{Bz}}{}^B\hat{r}_{I_z}^{SV_i} \\ L_{MN_{Bx}}{}^B\hat{r}_{I_x}^{SV_i} & L_{MN_{Bx}}{}^B\hat{r}_{I_y}^{SV_i} & L_{MN_{Bx}}{}^B\hat{r}_{I_z}^{SV_i} & L_{MN_{By}}{}^B\hat{r}_{I_x}^{SV_i} & L_{MN_{By}}{}^B\hat{r}_{I_y}^{SV_i} & L_{MN_{By}}{}^B\hat{r}_{I_z}^{SV_i} & L_{MN_{Bz}}{}^B\hat{r}_{I_x}^{SV_i} & L_{MN_{Bz}}{}^B\hat{r}_{I_y}^{SV_i} & L_{MN_{Bz}}{}^B\hat{r}_{I_z}^{SV_i} \\ L_{MN_{Bx}}{}^B\hat{r}_{I_x}^{SV_i} & L_{MN_{Bx}}{}^B\hat{r}_{I_y}^{SV_i} & L_{MN_{Bx}}{}^B\hat{r}_{I_z}^{SV_i} & L_{MN_{By}}{}^B\hat{r}_{I_x}^{SV_i} & L_{MN_{By}}{}^B\hat{r}_{I_y}^{SV_i} & L_{MN_{By}}{}^B\hat{r}_{I_z}^{SV_i} & L_{MN_{Bz}}{}^B\hat{r}_{I_x}^{SV_i} & L_{MN_{Bz}}{}^B\hat{r}_{I_y}^{SV_i} & L_{MN_{Bz}}{}^B\hat{r}_{I_z}^{SV_i} \\ & & & & \vdots & & & & \\ L_{MN_{Bx}}{}^B\hat{r}_{I_x}^{SV_i} & L_{MN_{Bx}}{}^B\hat{r}_{I_y}^{SV_i} & L_{MN_{Bx}}{}^B\hat{r}_{I_z}^{SV_i} & L_{MN_{By}}{}^B\hat{r}_{I_x}^{SV_i} & L_{MN_{By}}{}^B\hat{r}_{I_y}^{SV_i} & L_{MN_{By}}{}^B\hat{r}_{I_z}^{SV_i} & L_{MN_{Bz}}{}^B\hat{r}_{I_x}^{SV_i} & L_{MN_{Bz}}{}^B\hat{r}_{I_y}^{SV_i} & L_{MN_{Bz}}{}^B\hat{r}_{I_z}^{SV_i} \end{bmatrix} [A]_{9\times 1} \quad \text{Equation 5)}$$

ficient to solve for all nine elements of the $[A]_{9\times 1}$ matrix. In this specific case, Equation 7 is solved for only six elements of $[A]_{9\times 1}$ (the first two rows) and the remaining three elements (third row) is solved for by computing a vector cross product of the first two rows to form the third row ($\vec{\text{row}}_3 = \vec{\text{row}}_1 \times \vec{\text{row}}_2$). Again the resulting 3×3 matrix should be orthonormalized to ensure it represents a proper direction cosine matrix.

Although only two GPS SVs are technically required to determine three dimensional vehicle attitude, typically three or four GPS SVs are required to determine an antenna position, $^B\vec{r}_1^{SV_1}$, by GPS only systems. In the case of an inertial navigation system, or similar navigation aid, being available, the position solution from such systems may be used as the $^B\vec{r}_1^{SV_1}$ value and again only two GPS SVs are required to compute the GPS attitude solution.

In addition to computation of absolute whole value attitude, incremental attitude perturbation can be computed using differential carrier phase measurements as shown below. The attitude perturbation Equation 8 is similar to Equation 1, however, in this equation the observables include an estimate of the vehicle attitude, which as described further below may be provided as generated by GPS or from IMU measurements. The error, or perturbation, of this estimate is the unknown.

$$\Delta\Phi_{MNi} = \frac{2\pi}{\lambda}\left\{\vec{L}_{MN_B} \cdot \left\{\tilde{A}_I^B[I+\{\vec{\varepsilon}\}]\left(\frac{{}^I\hat{r}_I^{SV_i} - {}^I\hat{r}_I^B}{\|{}^I\hat{r}_I^{SV_i} - {}^I\hat{r}_I^B\|}\right)\right\}\right\} \quad \text{Equation 8)}$$

where:

$\tilde{A}_I^B$ is the estimated attitude matrix, transforming inertial to body frame, $\vec{\varepsilon}$ is the attitude error vector, and $\{\vec{\varepsilon}\}$ is the skew symmetric matrix representation of the attitude vector.

Using Equation 2 and rearranging the data, Equation 8 is rewritten as Equation 9.

$$\frac{\lambda}{2\pi}\Delta\Phi_{MNi} - \vec{L}_{MN_B} \cdot (\tilde{A}_I^B {}^I\hat{r}_I^{SV_i}) = \vec{L}_{MN_B} \cdot (\tilde{A}_I^B\{\vec{\varepsilon}\}{}^I\hat{r}_I^{SV_i}) \quad \text{Equation 9)}$$

Factoring out the attitude error vector into its own vector yields Equation 10.

$$\frac{\lambda}{2\pi}\Delta\Phi_{MNi} - \vec{L}_{MN_B} \cdot (\tilde{A}_I^B {}^I\hat{r}_I^{SV_i}) = \begin{bmatrix} \left(L_{MN_{B_z}}\tilde{A}_{I\,13}^B {}^I\hat{r}_y^{SV_i} - L_{MN_{B_z}}\tilde{A}_{I\,12}^B {}^I\hat{r}_z^{SV_i} + L_{MN_{B_y}}\tilde{A}_{I\,23}^B {}^I\hat{r}_y^{SV_i} - L_{MN_{B_y}}\tilde{A}_{I\,22}^B {}^I\hat{r}_x^{SV_i} + L_{MN_x}\tilde{A}_{I\,33}^B {}^I\hat{r}_z^{SV_i} - L_{MN_x}\tilde{A}_{I\,32}^B {}^I\hat{r}_z^{SV_i}\right)^T \\ \left(-L_{MN_{B_x}}\tilde{A}_{I\,13}^B {}^I\hat{r}_x^{SV_i} - L_{MN_{B_x}}\tilde{A}_{I\,11}^B {}^I\hat{r}_x^{SV_i} + L_{MN_{B_y}}\tilde{A}_{I\,23}^B {}^I\hat{r}_x^{SV_i} + L_{MN_{B_y}}\tilde{A}_{I\,21}^B {}^I\hat{r}_x^{SV_i} - L_{MN_z}\tilde{A}_{I\,33}^B {}^I\hat{r}_z^{SV_i} + L_{MN_x}\tilde{A}_{I\,31}^B {}^I\hat{r}_z^{SV_i}\right) \\ \left(L_{MN_{B_x}}\tilde{A}_{I\,12}^B {}^I\hat{r}_z^{SV_i} - L_{MN_{B_x}}\tilde{A}_{I\,11}^B {}^I\hat{r}_y^{SV_i} + L_{MN_{B_y}}\tilde{A}_{I\,22}^B {}^I\hat{r}_y^{SV_i} - L_{MN_{B_y}}\tilde{A}_{I\,21}^B {}^I\hat{r}_x^{SV_i} + L_{MN_z}\tilde{A}_{I\,32}^B {}^I\hat{r}_z^{SV_i} - L_{MN_x}\tilde{A}_{I\,32}^B {}^I\hat{r}_z^{SV_i}\right) \end{bmatrix} [E] \quad \text{Equation 10)}$$

where:

$$[E] = \begin{bmatrix} \varepsilon_x \\ \varepsilon_y \\ \varepsilon_z \end{bmatrix}$$

Equation 10 is used to set up a linear set of equations, much like that of Equation 5, using all tracked SVs (i, j, k, etc. or SVs1–6, etc.) and antenna pairs (MN, MO, MP, etc. or antenna pair 14 and 15, 15 and 16, etc.). This set of Equations can be represented using the symbols as shown in the following Equation 11.

$$[\Delta\Phi - L\tilde{A}R] = [L\tilde{A}\{-R\}][E] \quad \text{Equation 11)}$$

The solution to Equation 11 is found by forming a pseudo-inverse of the $[L\tilde{A}\{-R\}]$ matrix such that the following Equation 12 defining estimated attitude error is derived.

$$[E] = ([L\tilde{A}\{-R\}]^T[L\tilde{A}\{-R\}])^{-1}[L\tilde{A}-R]^T[\Delta\Phi - L\tilde{A}R] \quad \text{Equation 12)}$$

Equation 12 represents the perturbation, i.e., attitude error, solution to determine the error in the estimated vehicle attitude based upon the observable GPS differential phase measurements and the line of sight vectors to the tracked GPS SVs. To refine the computation of this perturbation value, an iterative evaluation technique is utilized to increase the accuracy.

The iterative technique, i.e., method of iteration, is achieved by evaluation of Equation 12 a first time to determine an initial estimate of the attitude error. The initially estimated attitude matrix $\tilde{A}_I^B$ is then updated using this value of the estimated attitude error using $\tilde{A}_I^B = \tilde{A}_I^B[I+\{\vec{\varepsilon}\}]$. This new value of $\tilde{A}_I^B$ is then used in a second evaluation of Equation 11 to form a second estimate of the attitude error. This iteration of the estimated attitude error continues until the computed changes in $\tilde{A}_I^B$ between consecutive iterations is zero, or sufficiently and effectively small. This iteration method is utilized to insure proper estimation of the estimated attitude error. Once the true estimated attitude error is known, by accumulating all the errors computed after each iteration, the true estimated attitude error can be used directly to update an INS as described below.

Although an iterative scheme is generally necessary, although not essential, to find an accurate solution to Equation 12, this method is advantageous over the absolute whole value attitude method described above in that Equation 12 only requires a 3×3 matrix inversion, instead of a 9×9 matrix inversion as required for absolute attitude computation. This smaller matrix inversion contributes to a more efficient and fast computation method for providing update values, to, for example, an INS.

In addition to computing attitude solutions using differential carrier phase measurements, absolute attitude and incremental perturbation attitude can also be generated using a position vector method as described below using the precise knowledge of antenna relative positions in inertial coordinates. This precise relative positioning is achieved through the use of GPS observable data. The method to solve for the attitude is similar to the method described above using differential carrier phase measurements, however, in this method only the observable GPS derived position of the antennas is required along with the antenna position within the defined antenna body frame as shown by Equation 13.

$$\begin{bmatrix} B_X \\ B_Y \\ B_Z \end{bmatrix}_M = A_I^B \begin{bmatrix} I_X \\ I_Y \\ I_Z \end{bmatrix}_M \qquad \text{Equation 13)}$$

where:

$A_I^B$ is the attitude matrix, transforming inertial to body frame,

B is the vector in the body frame,

I is the vector in the inertial frame, x,y,z are the axes within a reference frame, and M is the antenna index.

Equation 13 can be rewritten in terms of a nine element vector for computing the attitude solution as shown in Equation 14.

$$\begin{bmatrix} B_X \\ B_Y \\ B_Z \end{bmatrix}_M = \begin{bmatrix} I_x & I_y & I_z & 0 & 0 & 0 & 0 & 0 & 0 \\ 0 & 0 & 0 & I_x & I_y & I_z & 0 & 0 & 0 \\ 0 & 0 & 0 & 0 & 0 & 0 & I_x & I_y & I_z \end{bmatrix}_M \begin{bmatrix} A^B_{I\,11} \\ A^B_{I\,12} \\ A^B_{I\,13} \\ A^B_{I\,21} \\ A^B_{I\,22} \\ A^B_{I\,23} \\ A^B_{I\,31} \\ A^B_{I\,32} \\ A^B_{I\,33} \end{bmatrix} \qquad \text{Equation 14)}$$

By including each antenna location in Equation 14 of the three antenna/receiver sets, a linear set of equations can be formed for each of the GPS position measurements. This set of equations can then be written in symbolic form as shown with use of the symbols in Equation 15.

$$[B]=[I][A]_{9\times 1} \qquad \text{Equation 15)}$$

The solution to this Equation 15 is found by forming a pseudo-inverse of the [I] matrix such that the following Equation 16 is derived.

$$[A]_{9\times 1}=([I]^T[I])^{-1}[I]^T[B] \qquad \text{Equation 16)}$$

where:

T is the matrix transpose, and

−1 is the matrix inverse.

Equation 16 represents the solution to determine absolute vehicle attitude based upon the GPS position measurement of each antenna. A 9×9 matrix inversion is required to perform this calculation and as described above, orthonormalization is required to insure that matrix $[A]_{3\times 3}$ is a proper direction cosine matrix. It is to be noted that when using this relative position Equation 16, that the positions of each antenna in the inertial frame must be computed using the same set of GPS SVs to avoid errors in position computations.

In addition to computation of absolute whole value attitude using position vectors as described above, incremental attitude perturbation can be computed using position vectors as shown below. The attitude perturbation Equation 17 is similar to Equation 13, however, in this equation the observables include an estimate of the vehicle attitude which as described further below may be provided as generated by GPS or from IMU measurements along with the GPS measured positions of the antennas. The error of the estimated attitude, i.e., perturbation of this estimate, is the unknown.

$$\begin{bmatrix} B_x \\ B_y \\ B_z \end{bmatrix}_M = \tilde{A}_I^B\{\tilde{\varepsilon}\} \begin{bmatrix} I_x \\ I_y \\ I_z \end{bmatrix}_M \qquad \text{Equation 17)}$$

where:

$\tilde{A}_I^B$ is the estimated matrix, transforming inertial to body frame, $\sqrt{\varepsilon}$ is the attitude error vector, and $\{\sqrt{\varepsilon}\}$ is the skew-symmetric representation of the attitude vector.

By rearranging the data, Equation 17 can be rewritten as Equation 18, $$\begin{bmatrix} B_x \\ B_y \\ B_z \end{bmatrix}_M - \tilde{A}_I^B \begin{bmatrix} I_x \\ I_y \\ I_z \end{bmatrix}_M = \tilde{A}_I^B\{\tilde{\varepsilon}\} \begin{bmatrix} I_x \\ I_y \\ I_z \end{bmatrix}_M \qquad \text{Equation 18)}$$

Equation 18 is used to set up a linear set of equations using all tracked SVs and antenna pairs. This set of equations can be represented using the symbols as shown in the following Equation 19.

$$[B-\tilde{A}I]=[\tilde{A}\{-I\}][E] \qquad \text{Equation 19)}$$

The solution to Equation 19 is found by forming a pseudo-inverse of the $[\tilde{A}\{-I\}]$ matrix such that the following Equation 20 is derived.

$$[E]([\tilde{A}\{-I\}]^T[\tilde{A}\{-I\}])^{-1}[\tilde{A}\{-I\}]^T[B-\tilde{A}I] \qquad \text{Equation 20)}$$

Equation 20 represents the solution to determine the estimated attitude error in the vehicle attitude estimate based upon the measured position of the GPS antennas in both the inertial and body reference frames. A 3×3 matrix inversion is required to perform this calculation. As described above with regard to perturbation attitude computations using differential carrier phase measurements, to refine the computation of this estimated attitude error for increasing accuracy, an iterative technique substantially like that described previously is performed. This is accomplished by successively solving Equation 20 with continued improvements to the estimated $\tilde{A}_I^B$ and accumulation of the computed estimated errors representing the estimate attitude error for use, for example, in updating an INS as described further below.

The absolute attitudes and perturbation attitudes computed for a vehicle are described in terms of a direction cosine matrix (a nine element matrix), where this matrix is used to transform a three element vector from one reference frame to another in the above attitude solution methods. However, these equations can be similarly derived using a four parameter quaternion or Euler angles to represent vehicle attitude.

Once vehicle attitude has been determined such as, for example, by the above described methods using three or more antenna/receivers tracking at least two SVs, such attitude computations, i.e., absolute attitude and/or perturbation attitudes, can be integrated with an INS for use in initialization, alignment updates, and navigation updates, such as, for example, to expedite attainment of a vehicle attitude in the case of initialization and alignment, and to continuously correct errors in the vehicle attitude generated by an INS using measurements from an IMU thereof.

Typically, as previously described, inertial navigation systems (INS) determine attitude of the vehicle. An INS contains an inertial measurement unit (IMU) including gyroscopes, accelerometers, a processor unit to compute the navigation solutions necessary for navigation and attitude references, and various other data communication sources. The INS is alone sufficient to produce a vehicle navigation solution, including attitude. However, over time, the IMU sensor errors associated with computation of this solution increase. These errors can be corrected with the integration of GPS computed data, i.e., absolute and/or perturbation attitude computations.

Several INS methods have conventionally been used to optimally produce a navigation solution. As described in the Background of the Invention section, two such typical methods include the complementary filter method and the extended Kalman filter method. Such techniques are well known to those skilled in the art and have been described in detail in various publications, including, but clearly not limited to the following references. These references include: Anderson, B. and Moore, J., *Optimal Filtering*, Prentice-Hall (1979); Gelb, A., *Applied Optimal Estimation*, MIT Press (1974); and Robert, Grover, and Brown, *Introduction to Random Signal Analysis and Kalman Filtering*, John Wiley & Sons (1983). These references along with the reference, *Global Positioning System Theory and Applications*, Parkinson et. al., American Institute of Aeronautics and Astronautics (1996), which is one of many references that describes GPS technology, performance and applications thereof, provide a background for understanding the integration of GPS into an INS in accordance with the present invention as described herein. Such filtering techniques shall not be described in detail herein as those skilled in the art are knowledgeable of such techniques. For example, those skilled in the art know that the complementary filter method generally uses fixed gains in the computation of attitude update errors, whereas the Kalman filter method computes time varying gains based on available data to compute the attitude update errors. Both of these methods are conventionally utilized in an INS processor to blend the data/measurements from an IMU of the INS and any external navigation sources to compute estimated vehicle attitude.

Figure 2:
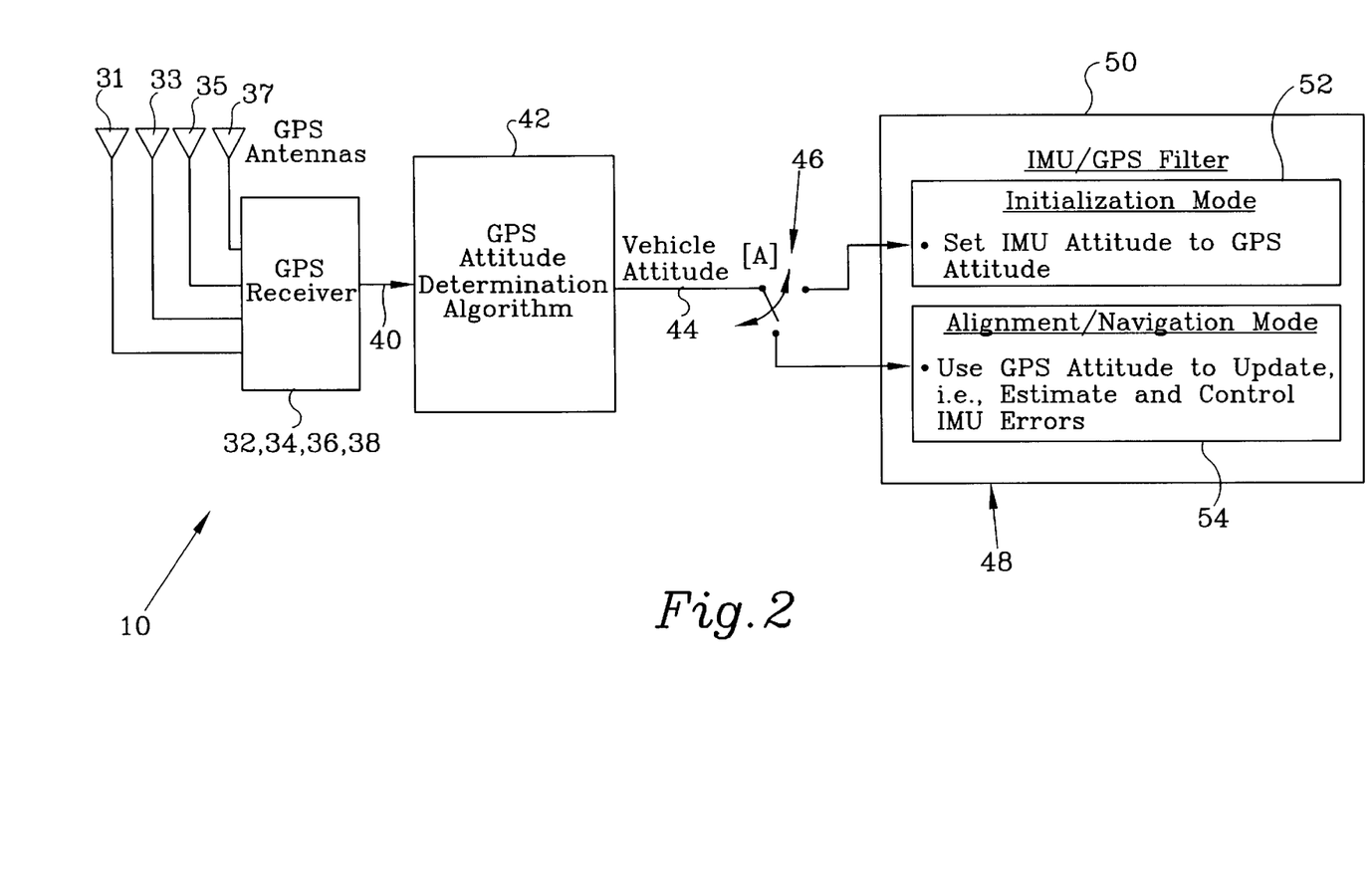
FIG. 2 is a general block diagram illustrating the integration of GPS absolute, i.e., whole value, attitude data into the modes of an INS in accordance with the present invention.
Figure 3:
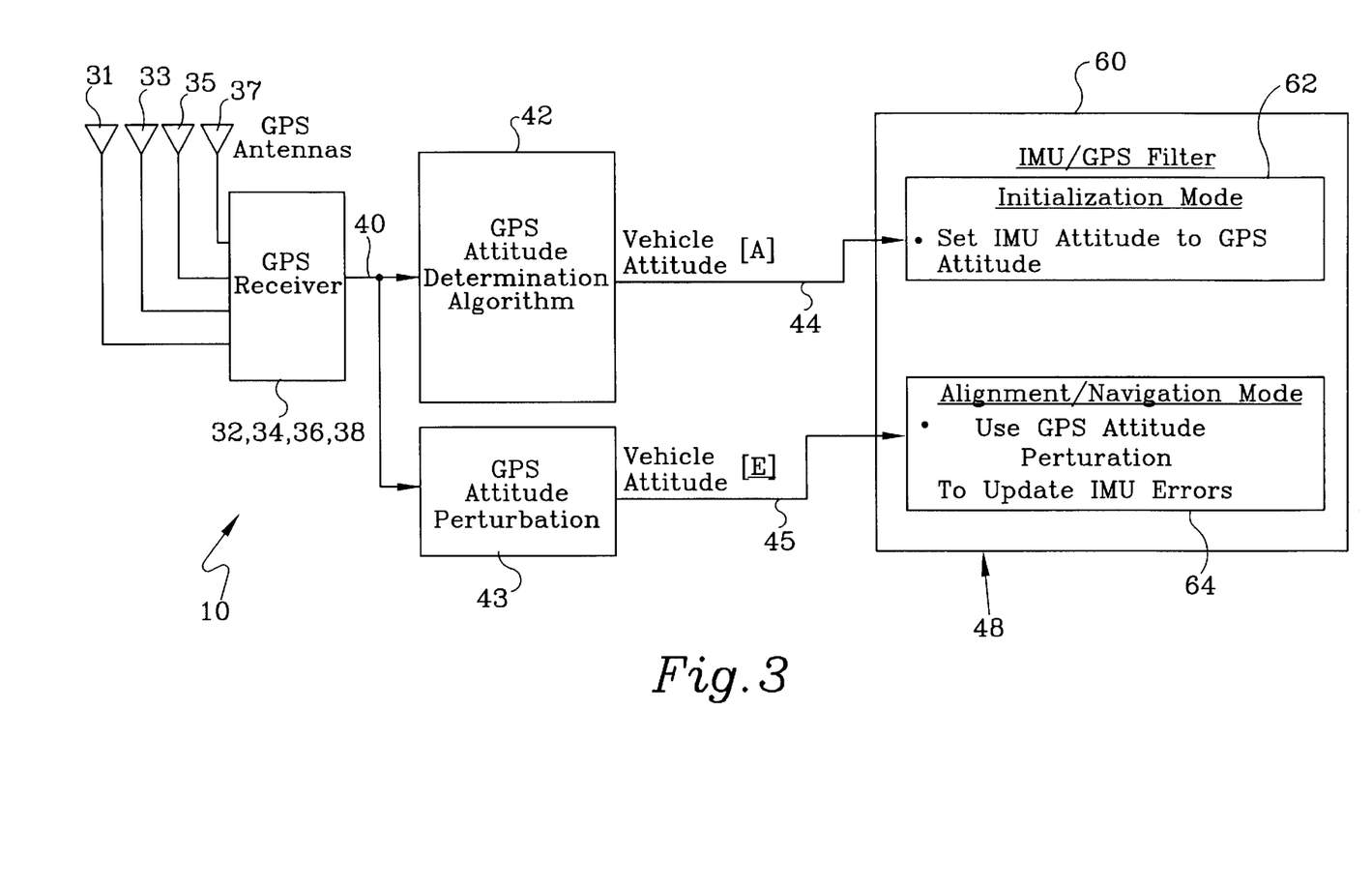
FIG. 3 is a general block diagram illustrating the integration of GPS perturbation, i.e., estimated error, attitude data and absolute, i.e., whole value, attitude data into the modes of an INS in accordance with the present invention.

FIGS. 2 and 3 are provided to generally show the integration of attitude data into an INS having an IMU and a filter in accordance with the present invention. The conventional INS having an IMU and a filter for generating vehicle attitude, typically operates in several modes which can be defined as an Initialization mode, an Alignment mode, and a Navigation mode. For example, Initialization mode is the mode in which an initial estimated vehicle attitude is generated by the INS. The Alignment mode is a mode in which the INS is aligned by coarse error updates by the filter of the system, and the Navigation mode is the mode in which the estimated attitude is continuously updated by finer refinements than made in the Alignment mode. Conventionally, the Initialization and Alignment modes were performed with the vehicle in stationary position or an initialization attitude was downloaded to a vehicle, for which attitude is to be determined, from a moving vehicle having the same attitude. For example, such downloaded attitude information may have been downloaded from a moving aircraft to a missile carried by the aircraft in order to initialize an INS of the missile. In accordance with the present invention, such stationary position of a vehicle during initialization and alignment or downloading of attitude data as described above is not required, in view of the integration of direct GPS attitude data available for such Initialization and Alignment modes. Therefore, initialization and alignment of an INS can be performed when the vehicle is in motion, i.e., missile on an aircraft, on a train, etc.

As shown in FIGS. 2 and 3, the attitude data generated using the GPS attitude determination system 10 as described in detail above can be integrated into the modes of an INS in varied manners. With respect to FIG. 2, integration of absolute, i.e., whole value, attitude data [A] 44, generated using the GPS attitude determination system 10, is integrated into the INS 50. The GPS attitude data 44 is generated by GPS attitude determination algorithm 42, such as the algorithm described above for absolute attitude computations using differential carrier phase measurements or vector positions either received from GPS receivers 32, 34, 36, 38 or computed from measurements provided by such GPS receivers. The receivers are connected to the respective antennas 31, 33, 35, 37 for receiving signals from two or more SVs.

As shown in FIG. 2 by the schematically illustrated switch 46, GPS absolute attitude data is provided to the INS 50 for both Initialization mode 52 and then further, is provided to an initialized INS for Alignment and Navigation modes 54 as well. In the Initialization mode 52, the GPS generated absolute attitude is used to set the estimated vehicle attitude of the INS 50, i.e., the attitude conventionally generated based on IMU measurements 48. After initialization of the INS 50, the estimated vehicle attitude generated by the INS 50 can be updated by the using the GPS absolute attitude 44, both during alignment and navigation (although the GPS data could be utilized just for Initialization mode as opposed to all three modes or just for Initialization and Alignment as opposed to all three modes). The GPS absolute attitude [A] 44 provides direct attitude data, which when compared to the estimated vehicle attitude generated by the filter using IMU measurements 48, provides an attitude update error for updating the INS estimated vehicle attitude as will be further described below.

With respect to FIG. 3, integration of absolute, i.e., whole value, attitude data [A] 44 and perturbation, i.e., estimated error, attitude data [E] 45 generated using the GPS attitude determination system 10, is integrated into the INS 60. The GPS absolute attitude data [A] 44 is generated by GPS attitude determination algorithm 42 as previously described, such as by the algorithm described above for absolute attitude computations using differential carrier phase measurements or vector positions either received from GPS receivers 32, 34, 36, 38 or computed from measurements provided by such GPS receivers. Further, the GPS perturbation attitude data [E] 45 is generated by GPS attitude determination algorithm 43 as previously described herein, such as by the algorithm described above for perturbation attitude computations using differential carrier phase measurements or vector positions either received from GPS receivers 32, 34, 36, 38 or computed from measurements provided by such GPS receivers.

As shown in FIG. 3 by the schematically illustrated generation of both GPS absolute attitude data [A] 44 and GPS perturbation attitude data [E] 45, absolute, i.e., whole value, attitude [A] 44 is provided to the INS 60 for the Initialization mode 62. Then, the perturbation attitude data [E] 45 is provided to an initialized INS for Alignment and Navigation modes 64. In the Initialization mode 62, the GPS generated absolute attitude [A] is used to set the estimated vehicle attitude of the INS 60, i.e., the attitude conventionally generated based on IMU measurements 48. After initialization of the INS 60, the estimated vehicle attitude generated by the INS 60 can be updated by the using the GPS perturbation attitude data, during alignment and navigation. It should be apparent, however, that the GPS perturbation data could be utilized just for the Alignment mode as opposed to both Alignment and Navigation modes, and further that GPS perturbation attitude data [E] may be utilized just for the Navigation mode alone.

By initialization of the INS using direct GPS absolute attitude and with use of either absolute or perturbation GPS attitude data to align the INS, near-instantaneous initialization and alignment is allowed. Further, by using absolute attitude data or perturbation data to provide navigational updates, the errors associated with estimated vehicle attitude generated based on IMU measurements can be corrected continuously. Such GPS attitude capabilities may reduce the required IMU, i.e., inertial sensors, performance and cost. Yet further, the continuous updates using perturbation data can be provided using a more efficient solution computation (i.e., a 3×3 matrix inversion rather than a 9×9 matrix inversion), as described with respect to the computations shown above.

Figure 4:
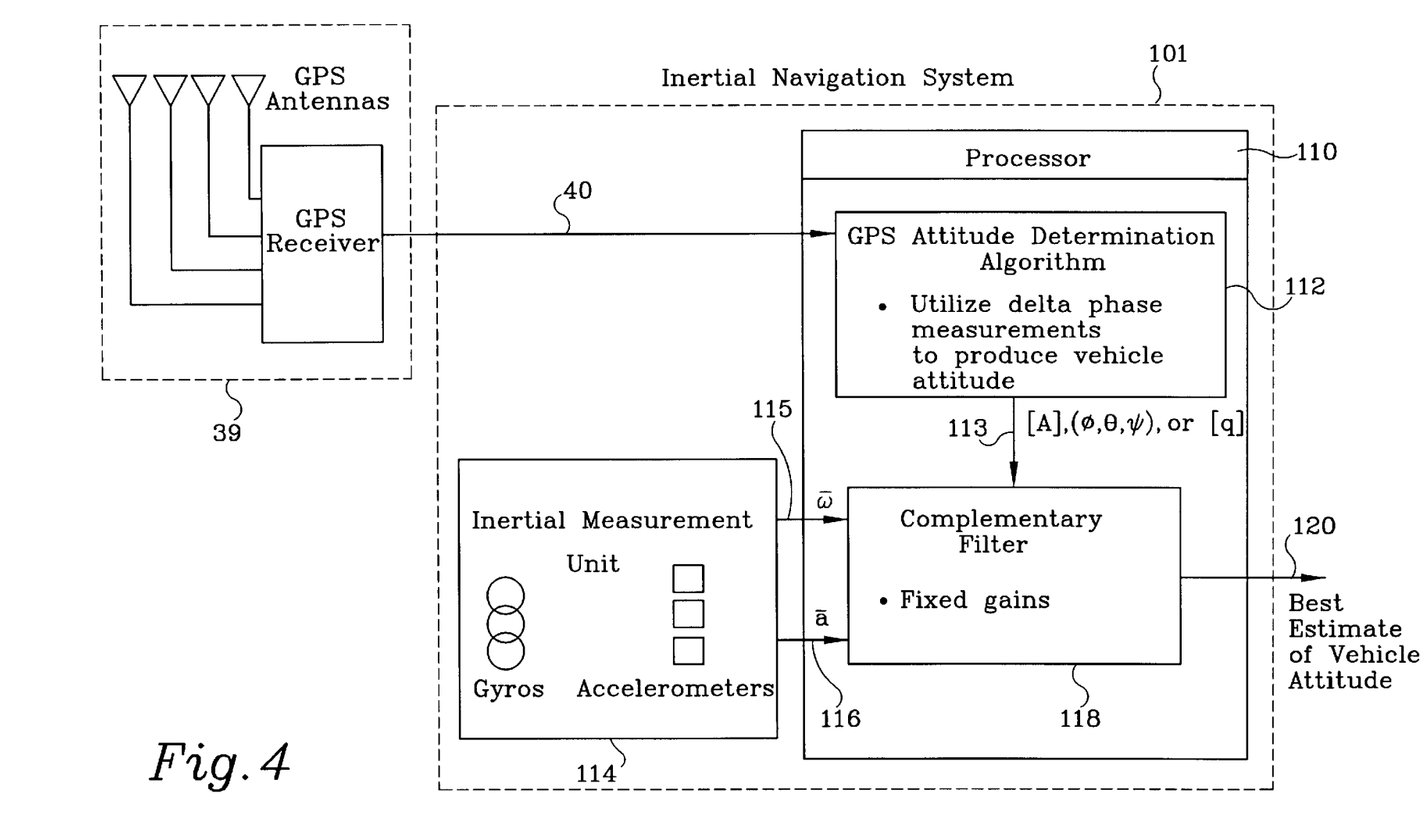
FIG. 4 is a general block diagram illustrating an INS integrated with GPS attitude determination system components in accordance with the present invention for integrating absolute, i.e., whole value, attitude data into the INS which includes a complimentary filter for generating estimates of vehicle attitude.
Figure 5:
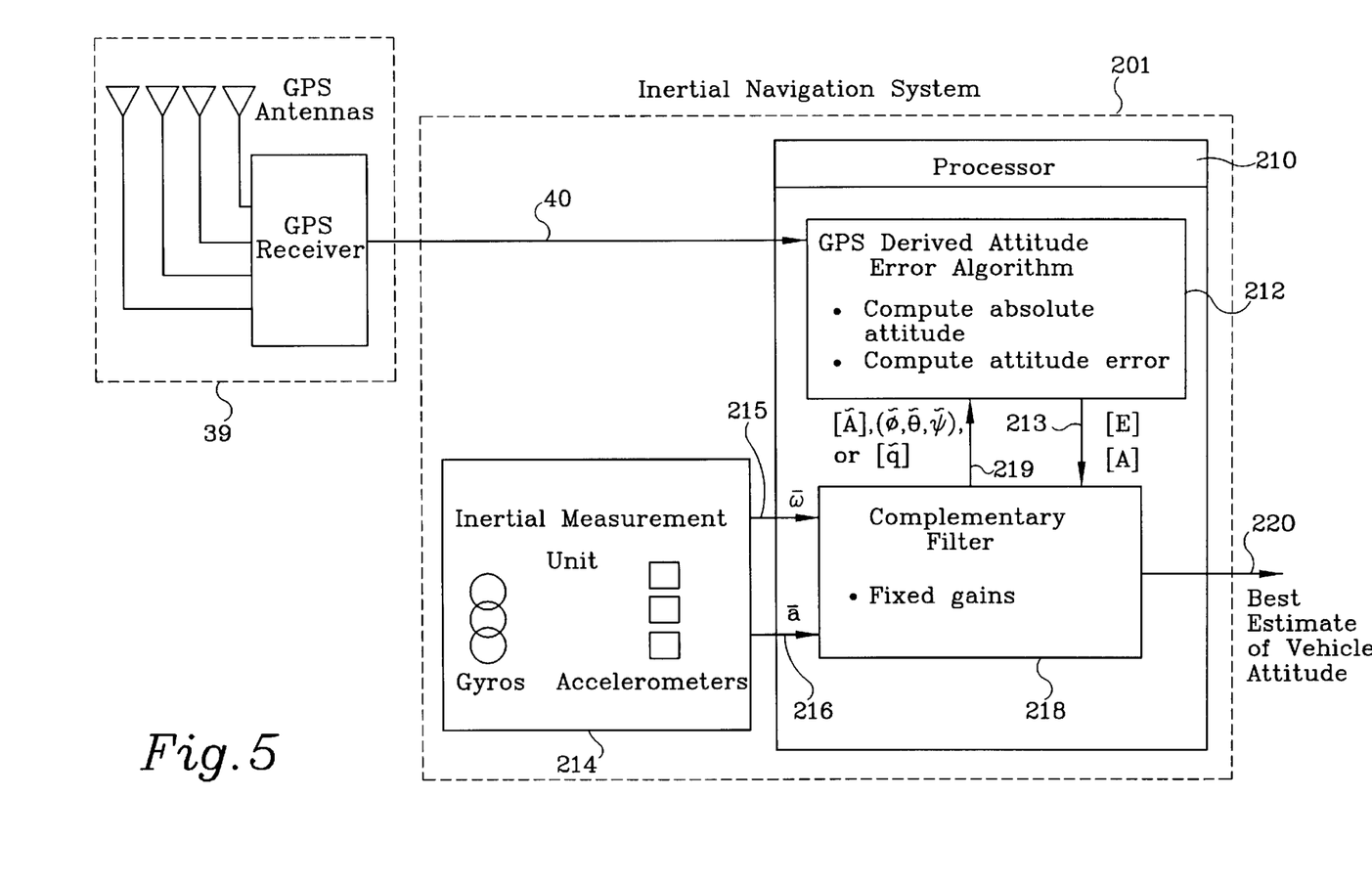
FIG. 5 is a general block diagram illustrating an INS integrated with GPS attitude determination system components in accordance with the present invention for integrating GPS perturbation, i.e., estimated error, attitude data and absolute, i.e., whole value, attitude data into the INS which includes a complimentary filter for generating estimates of vehicle attitude.
Figure 6:
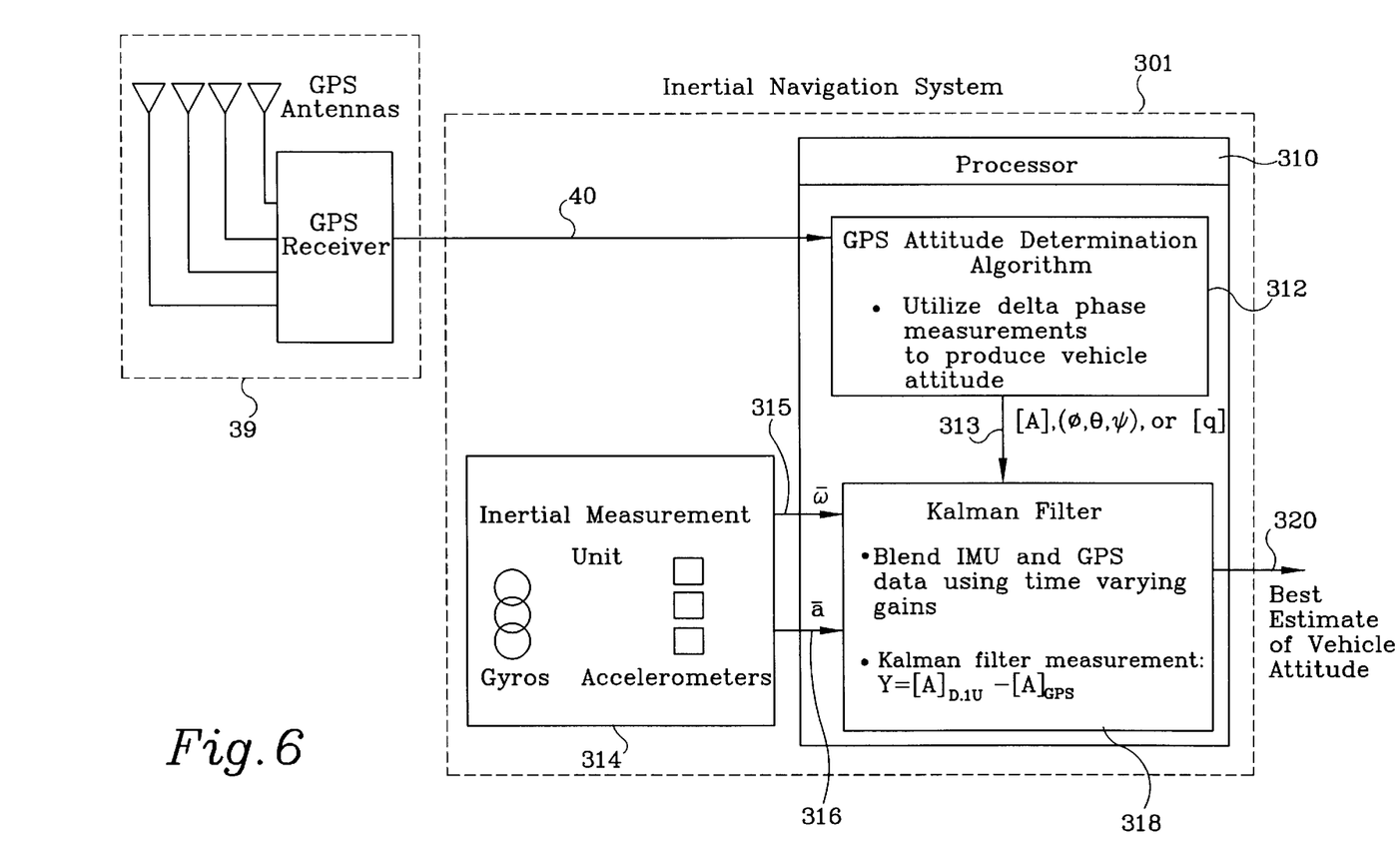
FIG. 6 is a general block diagram illustrating an INS integrated with GPS attitude determination system components in accordance with the present invention for integrating absolute, i.e., whole value, attitude data into the INS which includes a Kalman filter for generating estimates of vehicle attitude.
Figure 7:
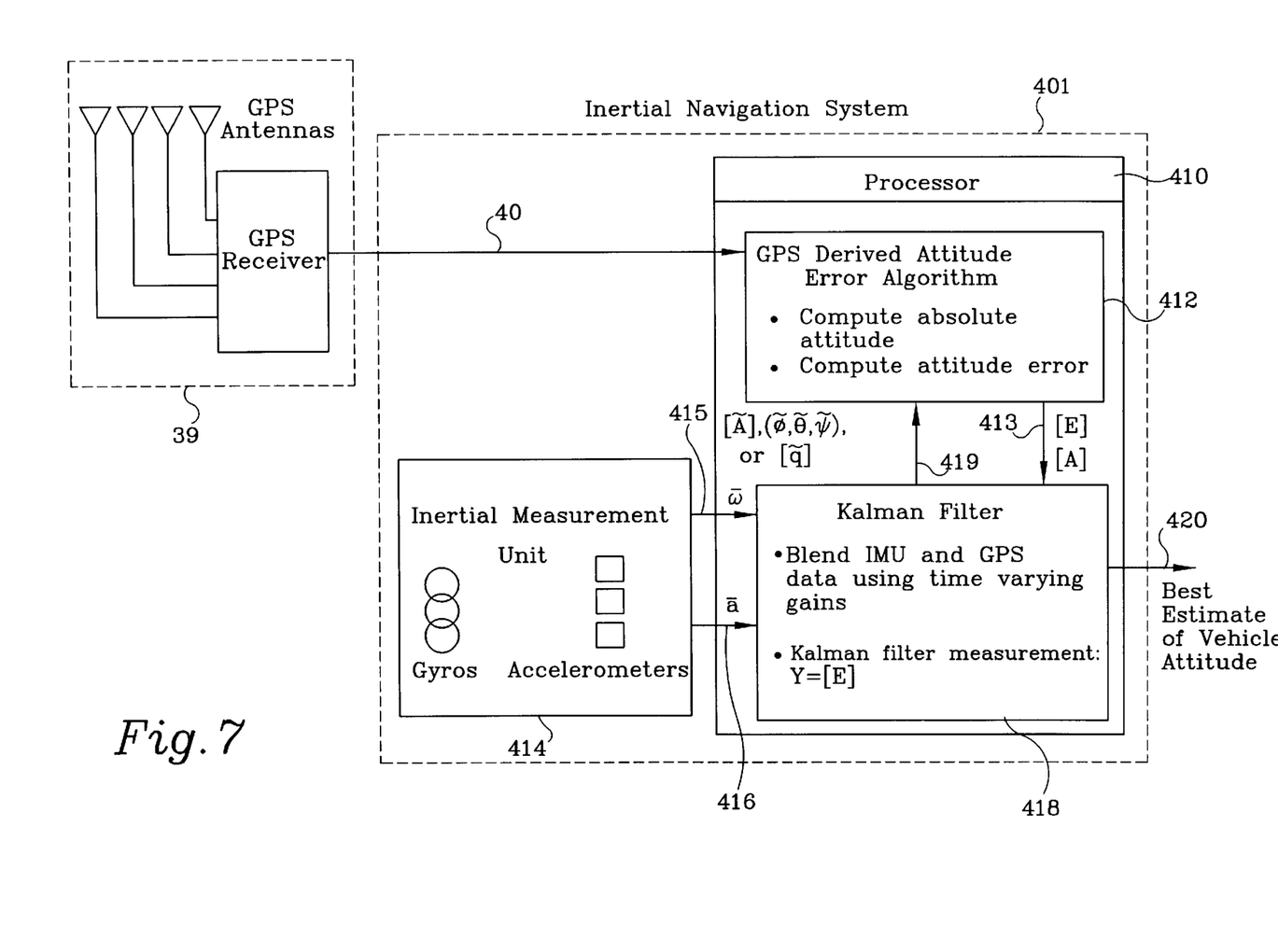
FIG. 7 is a general block diagram illustrating an INS integrated with GPS attitude determination system components in accordance with the present invention for integrating GPS perturbation, i.e., estimated error, attitude data and absolute, i.e., whole value, attitude data into the INS which includes a Kalman filter for generating estimates of vehicle attitude.

FIGS. 4–7 are general block diagrams illustrating various configurations of INS's integrated with GPS attitude determination system components in accordance with the present invention for integrating GPS perturbation, i.e., estimated error, attitude data and/or absolute, i.e., whole value, attitude data into the INS's. FIGS. 4 and 5 illustrate INS's including the use of a complimentary filter whereas FIGS. 6 and 7 illustrate INS's including the use of a Kalman filter.

As shown in FIG. 4, an INS 101 is integrated with GPS attitude determination system components for integrating absolute, i.e., whole value, attitude data 113 into the INS 101. The GPS antenna/receiver sets 39 are like those shown and described with reference to FIGS. 1–3. The GPS antenna/receiver sets 39 recover and provide GPS data 40 to a processor 110 of the INS 101 from two or more SVs being tracked. The GPS data 40 may be carrier phase measurements, differential carrier phase measurements (if the differential carrier phase measurements are generated at the receiver as opposed to in the INS), position vector data, or any other data necessary for calculation of GPS absolute or perturbation attitude data [A] as described previously above. Hereinafter, the description with reference to FIGS. 4–7 shall be limited to, for simplicity, the provision of differential carrier phase measurements for computation of absolute attitude [A] and perturbation attitude [E]. The INS 101 further includes an IMU 114. The IMU 114 may be any IMU for providing measurement data, i.e., $\vec{\omega}$ 115 (measured body rate from gyroscopes) and $\vec{\alpha}$ 116 (measured body acceleration from accelerometers), necessary to calculate attitude for a vehicle. For example, IMU 114, and other IMUs described herein, may include any number or type of gyroscopes, any number or type of accelerometers, or any other components conventionally utilized to provide measurement data for generating navigational vehicle attitude computations.

The processor 110 includes GPS attitude determination algorithm 112 as previously described herein for computation of absolute attitude using the differential carrier phase measurements from the GPS antenna/receiver sets 39. The absolute attitude [A] 113 includes roll, pitch/elevation, and yaw/azimuth (φ, θ, Ψ) as readily known to one skilled in the art. The processor 110 further includes complimentary filter 118 having fixed gains for computing a best estimate of vehicle attitude 120 using measurements made by IMU 114.

The GPS attitude determination algorithm 112 utilizes differential phase measurements 40 to generate absolute attitude data 113 for use by the complementary filter 118. The complementary filter may use the absolute data 113 for initialization values of the best estimate of vehicle attitude 120, i.e., the vehicle attitude conventionally generated using measurements from the IMU can be set to the absolute attitude generated using GPS. The INS 101 is then aligned, and/or updated during Navigation mode. The initialized complimentary filter 118 is run to continuously provide an estimated vehicle attitude using measurements from the IMU, and also GPS absolute attitude data 113, when available. When GPS absolute attitude is available, the GPS absolute attitude 113 is differenced with the attitude generated with use of inertial measurements from the IMU 114. The differenced attitude value, i.e., delta [A], is then used along with a delta $\vec{\alpha}$ value, i.e., a delta measured body acceleration value, by a proportional and integral controller of the filter 118 to form an estimate of the error in the rotation rate, delta $\vec{\omega}$. The delta [A] is multiplied by a fixed gain to provide a proportional estimate of the rotation rate error, delta $\vec{\omega}$. The delta a value, i.e., the delta measured body acceleration value, is integrated over time and multiplied by proportionality constants to provide a proportional estimate of the rotation rate error. These two proportional estimates are then summed together to produce the total estimate of rotation rate error, delta $\vec{\omega}$, which when used to correct the measured body rotation rate, ( 115 from the IMU 114 is sufficient to correct errors in the attitude computed using IMU measurements. The GPS attitude computation is provided to the filter 118 at a suitable rate for sufficient attitude correction. This rate could be as fast as 20 Hz, but generally is provided at 0.1 to 1.0 Hz.

As shown in FIG. 5, an INS 201 is integrated with GPS attitude determination system components for integrating absolute, i.e., whole value, attitude data [A] and GPS perturbation, i.e., estimated error, attitude data [E] 213 into the INS 201. The GPS antenna/receiver sets 39 and measurement data 40 are as described above with respect to FIG. 4. The INS 201 further includes an IMU 214 and processor 210. The processor 210 includes GPS attitude determination algorithm 212 as previously described herein for computation of absolute attitude and perturbation attitude using the differential carrier phase measurements from the GPS antenna/receiver sets 39. The absolute attitude [A] includes roll, pitch/elevation, and yaw/azimuth (φ, θ, Ψ) as readily known to one skilled in the art. The perturbation attitude is an attitude error [E] calculated using an estimated vehicle attitude as previously described. The estimated vehicle attitude may be an IMU estimated attitude 219 provided to the algorithm 212 as shown in FIG. 5 for computing perturbation attitude, i.e., estimated attitude errors, or it may be an estimated GPS vehicle attitude, or it may be the best estimate 220 from filter 218. The processor 210 includes the complimentary filter 218 having fixed gains for computing a best estimate of vehicle attitude 220 using measurements made by IMU 214, i.e. $\vec{\omega}$ 215 and $\vec{\alpha}$ 216.

The GPS attitude determination algorithm 212 utilizes differential phase measurements 40 to generate absolute attitude data and perturbation attitude data 213 for use by the complimentary filter 218. The complementary filter may use the absolute data 213 for initialization values of the best estimate of vehicle attitude 220, i.e., the vehicle attitude conventionally generated using measurements from the IMU can be set to the absolute attitude generated using GPS. The INS 201 is then aligned, and/or updated during Navigation mode. The initialized complimentary filter 218 is run to provide an estimated vehicle attitude using measurements from the IMU and also GPS perturbation attitude data 213, when available. When GPS perturbation attitude, i.e., GPS estimated attitude error [E], is available, the GPS perturbation attitude 213 is used along with a delta $\vec{a}$ value, i.e., measured body acceleration value, by a proportional and integral controller of the filter 218 to generate a delta $\vec{\omega}$ value as described above with reference to FIG. 4. The only difference is that the delta [A] used previously is provided directly by [E].

As shown in FIG. 6, an INS 301 is integrated with GPS attitude determination system components for integrating absolute, i.e., whole value, attitude data [A] 313 into the INS 201. The GPS antenna/receiver sets 39 and measurement data 40 are as described above with respect to FIG. 4. The INS 301 further includes an IMU 314 and processor 310. The processor 310 includes GPS attitude determination algorithm 312 as previously described herein for computation of absolute attitude using the differential carrier phase measurements from the GPS antenna/receiver sets 39. The processor 310 further includes extended Kalman filter 318 for blending GPS absolute attitude data 313 and measurements made by IMU 314, i.e., $\vec{\omega}$ 315 and $\vec{a}$ 316, for estimating a best estimate of vehicle attitude 320.

The GPS attitude determination algorithm 312 utilizes differential phase measurements 40 to generate absolute attitude data 313 for use by the Kalman filter 318. The Kalman filter may use the absolute data [A] for initialization values of the best estimate of vehicle attitude 320, i.e., the vehicle attitude conventionally generated using measurements from the IMU can be set to the absolute attitude generated using GPS. The INS 301 is then aligned and/or updated during Navigation mode. The initialized Kalman filter 318 is run to continuously provide an estimated vehicle attitude using measurements from the IMU 314 and also GPS absolute attitude data 313, when available. When GPS absolute attitude 313 is available, the GPS absolute attitude 313 is difference with the attitude generated with use of inertial measurements from the IMU 314. The differenced value is then used by the Kalman filter as an attitude error measurement. This measurement is processed by the Kalman filter, along with the IMU data, to provide the best estimate of IMU attitude, gyro error quantities, accelerometer error quantities and any other important and observable errors of the system. The estimated errors can be derived in the form of an attitude matrix, or rotation rate $\vec{\omega}$, depending upon the mechanization of the filter. These estimated errors by the filter are used to correct the errors from the IMU data to provide the best estimate of the attitude solution 320.

As shown in FIG. 7, an INS 401 is integrated with GPS attitude determination system components for integrating absolute, i.e., whole value, attitude data [A] and GPS perturbation, i.e., estimated error, attitude data [E] 413 INS 40INS 401. The GPS antenna/receiver described above with respect to FIG. 4. The INS 401 further includes an IMU 414 and processor 410. The processor 410 includes GPS attitude determination algorithm 412 as previously described herein for computation of absolute attitude and perturbation attitude using the differential carrier phase measurements from the GPS antenna/receiver sets 39. The perturbation attitude is an attitude error [E] calculated using an estimated vehicle attitude as previously described. The estimated vehicle attitude may be an IMU estimated attitude 419 provided to the algorithm 412 as shown in FIG. 7 for computing perturbation attitude, i.e., estimated attitude errors, or it may be an estimated GPS vehicle attitude. The processor 410 further includes Kalman filter 418 having computed time varying gains for computing a best estimate of vehicle attitude 420 using measurements made by IMU 414, i.e., $\vec{\omega}$ 415 and $\vec{a}$ 416.

The GPS attitude determination algorithm 412 utilizes differential phase measurements 40 to generate absolute attitude data and perturbation attitude data 413 for use by the Kalman filter 418. The Kalman filter 418 may use the absolute data [A] for initialization values of the best estimate of vehicle attitude 420, i.e., the vehicle attitude conventionally generated using measurements from the IMU can be set to the absolute attitude generated using GPS. The INS 401 is then aligned, and/or updated during Navigation mode. The initialized Kalman filter is run to continuously provide estimated vehicle attitude using measurements from the IMU and also GPS perturbation data, i.e., GPS estimated attitude errors [E], when available. When the GPS perturbation attitude data [E] is available, it is used as direct attitude error measurement to the Kalman filter. This error measurement is then used by the Kalman filter in the same manner as described above with reference FIG. 6 and the differenced value.

Although the invention has been described with particular reference to preferred embodiments thereof, variations and modifications of the present invention can be made within a contemplated scope of the following claims as is readily known to one skilled in the art.

What is claimed is:

1. A method for use in vehicle attitude determination, the method comprising the steps of:

providing an inertial navigation system including a filter for receiving at least one or more inertial measurements for use in generating a vehicle attitude estimate;

generating GPS attitude solutions for a vehicle using three or more antennas receiving GPS signals from two or more space vehicles independent of the inertial measurements;

providing the GPS attitude solutions to the filter; and initializing the inertial navigation system by setting the vehicle attitude estimate of the inertial navigation system to one of the GPS attitude solutions generated for the vehicle.

2. The method according to claim 1, wherein the method further includes aligning the inertial navigation system by updating the vehicle attitude estimate of the initialized inertial navigation system using the GPS attitude solutions generated for the vehicle independent of the inertial measurements.

3. The method according to claim 2, wherein the aligning step includes updating the vehicle attitude estimate of the initialized inertial navigation system using an attitude error generated from the difference between an attitude generated using inertial measurements from a inertial measurement unit and a GPS attitude solution generated independent of the inertial measurements.

4. The method according to claim 2, wherein the initialization and alignment steps are performed when the vehicle is in motion.

5. The method according to claim 1, wherein the method further includes:

computing GPS estimated attitude errors using the three or more antennas receiving GPS signals from two or more space vehicles; and aligning the inertial navigation system by updating the vehicle attitude estimate of the inertial navigation system using the GPS estimated attitude errors.

6. The method according to claim 5, wherein the initialization and alignment steps are performed when the vehicle is in motion.

7. The method according to claim 5, wherein the computation step includes generating a GPS estimated attitude error using the at least three antennas and signals from the at least two space vehicles in addition to an estimate of vehicle attitude computed using inertial measurements.

8. The method according to claim 5, wherein the computation step includes generating a GPS estimated attitude error using the at least three antennas and signals from the at least two space vehicles in addition to an estimate of vehicle attitude computed using prior GPS measurements.

9. The method according to claim 5, wherein the computation step includes:
providing an estimated vehicle attitude; and
determining an error in the estimated vehicle attitude using the at least three antennas and signals from the at least two space vehicles resulting in a GPS estimated attitude error.

10. The method according to claim 9, wherein the determining step includes iteratively estimating the error in the estimated vehicle attitude to attain the GPS estimated attitude error.

11. The method according to claim 9, wherein the determining step includes estimating the error in the estimated vehicle attitude using differential carrier phase measurements.

12. The method according to claim 9, wherein the determining step includes estimating the error in the estimated vehicle attitude using GPS measured positions of the at least three antennas using signals from the at least two space vehicles.

13. The method according to claim 1, wherein the method further includes updating the vehicle attitude estimate of the inertial navigation system using the GPS attitude solutions generated for the vehicle independent of the inertial measurements.

14. The method according to claim 13, wherein the updating step includes updating the vehicle attitude estimate of the inertial navigation system using an attitude error generated from the difference between an attitude generated using inertial measurements of an inertial measurement unit and a GPS attitude solution generated independent of the inertial measurements.

15. The method according to claim 1, wherein the method further includes:
computing GPS estimated attitude errors using the three or more antennas receiving GPS signals from two or more space vehicles; and
updating the vehicle attitude estimate of the inertial navigation system using the GPS estimated attitude errors.

16. The method according to claim 15, wherein the computation step includes:
providing an estimated vehicle attitude; and
determining an error in the estimated vehicle attitude using the at least three antennas and signals from the at least two space vehicles resulting in a GPS estimated attitude error.

17. A method for use in vehicle attitude determination, the method comprising the steps of:
providing an inertial navigation system including a filter for receiving at least one or more inertial measurements for use in generating a vehicle attitude estimate;
generating GPS estimated attitude errors for a vehicle using at least three antennas receiving signals from at least two space vehicles;
providing the GPS estimate attitude errors to the filter; and
updating the vehicle attitude estimate of an inertial navigation system using the GPS estimated attitude errors.

18. The method according to claim 17, wherein the generation step includes generating a GPS estimated attitude error using the at least three antennas and signals from the at least two space vehicles in addition to an estimate of vehicle attitude computed using inertial measurements.

19. The method according to claim 17, wherein the generation step includes generating a GPS estimated attitude error using the at least three antennas and signals from the at least two space vehicles in addition to an estimate of vehicle attitude computed using prior GPS measurements.

20. The method according to claim 17, wherein the generation step includes:
providing an estimated vehicle attitude; and
determining an error in the estimated vehicle attitude using the at least three antennas and signals from the at least two space vehicles resulting in a GPS estimated attitude error.

21. The method according to claim 20, wherein the determining step includes iteratively estimating the error in the estimated vehicle attitude to attain the GPS estimated attitude error.

22. The method according to claim 21, wherein the error estimation includes a 3×3 matrix inversion to provide a solution of a 3 element error vector.

23. The method according to claim 20, wherein the determining step includes estimating the error in the estimated vehicle attitude using differential carrier phase measurements.

24. The method according to claim 20, wherein the determining step includes estimating the error in the estimated vehicle attitude using GPS measured positions of the at least three antennas using signals from the at least two space vehicles.

25. A system for use in vehicle navigation, the system comprising:
three or more GPS antenna/receiver sets associated with a vehicle;
an inertial measurement unit for providing inertial measurements for the vehicle; and a processing unit, the processing unit including:
GPS attitude determination means for generating attitude computations for the vehicle using the three or more GPS antenna/receiver sets and signals from two or more space vehicles, the attitude computations including at least one of GPS absolute attitudes generated independent of the inertial measurements and GPS estimated attitude errors, and
filter means for receiving as inputs thereto the inertial measurements and attitude computations, wherein the filter means generates estimates of attitude for the vehicle using the inertial measurements from the inertial measurement unit and the attitude computations.

26. The system according to claim 25, wherein the filter means is initialized using a GPS absolute attitude from the GPS attitude determination means generated independent of the inertial measurements.

27. The system according to claim 25, wherein the filter means includes means for comparing an attitude generated using inertial measurements from the inertial measurement unit and a GPS absolute attitude to generate an estimated attitude error.

28. The system according to claim 25, wherein the GPS attitude determination means includes means for generating a GPS estimated attitude error using the at least three antennas and signals from the at least two space vehicles in addition to an estimate of vehicle attitude computed using inertial measurements from the inertial measurement unit.

29. The system according to claim 25, wherein the GPS attitude determination means includes means for generating a GPS estimated attitude error using the at least three antennas and signals from the at least two space vehicles in addition to an estimate of vehicle attitude computed using prior GPS measurements.

30. The system according to claim 25, wherein the GPS attitude determination means includes:

means for providing an estimated vehicle attitude; and means for determining an error in the estimated vehicle attitude using the at least three antennas and signals from the at least two space vehicles resulting in a GPS estimated attitude error.

31. The system according to claim 30, wherein the GPS attitude determination means includes means for iteratively estimating the error in the estimated vehicle attitude to attain the GPS estimated attitude error.

32. The system according to claim 30, wherein the GPS attitude determination means includes means for estimating the error in the estimated vehicle attitude using differential carrier phase measurements.

33. The system according to claim 30, wherein the GPS attitude determination means includes means for estimating the error in the estimated vehicle attitude using GPS measured positions of the at least three antennas using signals from the at least two space vehicles.

\* \* \* \* \*